United States Patent
Chen et al.

(10) Patent No.: US 11,533,757 B2
(45) Date of Patent: Dec. 20, 2022

(54) SCRAMBLER INITIALIZATION FOR MULTI-USER CLEAR TO SEND TRANSMISSION

(71) Applicant: Intel Corporation, Santa Clara, CA (US)

(72) Inventors: Xiaogang Chen, Portland, OR (US); Qinghua Li, San Ramon, CA (US); Feng Jiang, Santa Clara, CA (US); Po-Kai Huang, San Jose, CA (US); Assaf Gurevitz, Ramat Hasharon (IL)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 17/115,751

(22) Filed: Dec. 8, 2020

(65) Prior Publication Data

US 2021/0092773 A1 Mar. 25, 2021

Related U.S. Application Data

(63) Continuation of application No. 16/233,071, filed on Dec. 26, 2018, now abandoned.

(60) Provisional application No. 62/645,943, filed on Mar. 21, 2018.

(51) Int. Cl.
*H04W 74/08* (2009.01)
*H04B 7/0452* (2017.01)

(52) U.S. Cl.
CPC ...... *H04W 74/0816* (2013.01); *H04B 7/0452* (2013.01)

(58) Field of Classification Search
CPC ...... H04B 7/04; H04B 7/0413; H04B 7/0452; H04W 74/08; H04W 74/0808; H04W 74/081
See application file for complete search history.

(56) References Cited

U.S. PATENT DOCUMENTS

| | | | |
|---|---|---|---|
| 9,876,614 B1* | 1/2018 | Sun | H04L 1/1685 |
| 10,790,937 B1* | 9/2020 | Sun | H04L 1/1867 |
| 2014/0286356 A1* | 9/2014 | You | H04L 69/22 370/474 |
| 2015/0296517 A1* | 10/2015 | Yu | H04L 25/0202 370/338 |
| 2015/0373587 A1* | 12/2015 | Josiam | H04L 5/0064 370/338 |
| 2016/0150536 A1* | 5/2016 | Valliappan | H04L 45/74 370/329 |
| 2016/0164652 A1* | 6/2016 | Huang | H04L 5/0007 370/329 |
| 2016/0316455 A1* | 10/2016 | Asterjadhi | H04W 74/0816 |
| 2016/0316468 A1* | 10/2016 | Huang | H04L 45/74 |

(Continued)

*Primary Examiner* — Jenee Holland
(74) *Attorney, Agent, or Firm* — Eversheds Sutherland (US) LLP

(57) ABSTRACT

This disclosure describes systems, methods, and devices related to scrambler initialization for multi-user (MU) clear to send (CTS) transmission. A first device may identify a MU request to send (RTS) frame received from a second device. The first device may determine an initial state of a scrambler based on the first 7 bits of a service field of the MU-RTS frame. The first device may cause first data to be scrambled, using the initial state of the scrambler, resulting in second data. The first device may cause to send a MU-CTS frame that comprises the second data to the second device.

20 Claims, 6 Drawing Sheets

(56) References Cited

U.S. PATENT DOCUMENTS

| | | | | |
|---|---|---|---|---|
| 2016/0330757 | A1* | 11/2016 | Cherian | H04W 72/1268 |
| 2017/0104563 | A1* | 4/2017 | Lee | H04L 5/0044 |
| 2017/0164241 | A1* | 6/2017 | Kasher | H04W 72/0446 |
| 2017/0170939 | A1* | 6/2017 | Huang | H04W 74/006 |
| 2017/0208625 | A1* | 7/2017 | Choi | H04L 27/26 |
| 2018/0014334 | A1* | 1/2018 | Ahn | H04W 52/0219 |
| 2020/0186746 | A1* | 6/2020 | Jiang | B29C 45/14434 |
| 2021/0329642 | A1* | 10/2021 | Chen | H04W 74/006 |

* cited by examiner

US 11,533,757 B2

SCRAMBLER INITIALIZATION FOR MULTI-USER CLEAR TO SEND TRANSMISSION

CROSS-REFERENCE TO RELATED APPLICATION(S)

This application is a Continuation of U.S. Non-Provisional application Ser. No. 16/233,071 filed Dec. 26, 2018, which claims the benefit of U.S. Provisional Application No. 62/645,943, filed Mar. 21, 2018, all disclosures of which are incorporated herein by reference as if set forth in full.

TECHNICAL FIELD

This disclosure generally relates to systems, methods, and devices for wireless communication and, more particularly, to scrambler initialization for multi-user (MU) clear to send (CTS) transmission.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
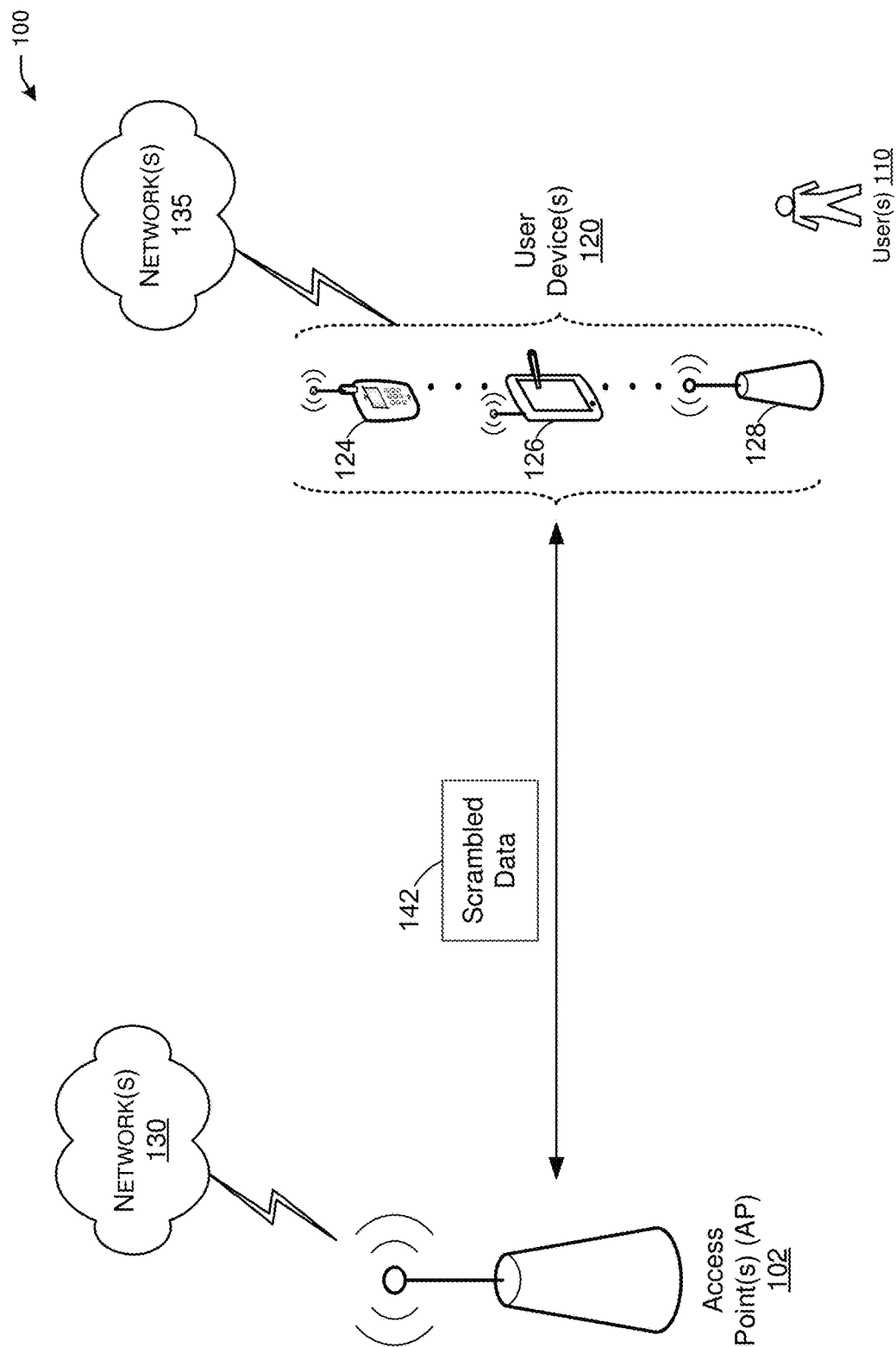
FIG. 1 is a network diagram illustrating an example network environment for scrambler initialization for multi-user (MU) clear to send (CTS) transmission, in accordance with one or more example embodiments of the present disclosure.

Example embodiments described herein provide certain systems, methods, and devices for scrambler initialization for multi-user (MU) clear to send (CTS) transmission. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Multiple station devices (STAs) may receive a MU request to send (MU-RTS) from a transmitting device. In the MU-CTS response to the MU-RTS, different physical layer convergence protocol (PLCP) protocol data units (PPDUs) carrying the MU-CTS response from the multiple different STAs may have the same content. For example, the multiple MU-CTS responses having the same content may enable the demodulation of the MU-CTS response at access point (AP). However, the current 802.11 specification, which guarantees the information bits from different STAs are the same, does not make it clear on how to generate the scrambling sequence for the MU-CTS transmission. A device responding to a MU-RTS transmission needs a way to determine a scrambling sequence for a MU-CTS transmission.

Example embodiments of the present disclosure relate to systems, methods, and devices for scrambler initialization for MU-CTS transmission.

According to some embodiments, a scrambler initialization for an MU-CTS transmission system may generate a Data field of a PPDU for a MU-MIMO transmission (e.g., a MU-RTS frame and/or a MU-CTS frame). During transmission, one or more PLCP service data units (PSDUs) may be processed (e.g., scrambled and coded) and appended to the physical layer (PHY) preamble to create a PPDU.

According to some embodiments, a scrambler initialization for an MU-CTS transmission system may generate the Data field of a MU-MIMO transmission by passing the data through a scrambler to obtain scrambled data. The Data field may contain a Service field, a PSDU, one or more tail bits, and/or one or more pad bits. The data within the Data field (e.g., all of the bits of the Data field) may be scrambled, for example by the scrambler.

According to some embodiments, a scrambler initialization for an MU-CTS transmission system may determine the Service field, which may include a set number of bits (e.g., 16 bits). One or more portions of the Service field may be used to scramble or descramble data. For example, the first 7 bits of the Service field may be used to scramble or descramble data. For example, the bits of the Service field may be used to initialize a register of the scrambler. The register of the scrambler may be used to scramble outgoing data and/or to unscramble incoming data.

According to some embodiments, a scrambler initialization for an MU-CTS transmission system may include a scrambler that may be a length-127 PPDU-synchronous scrambler. For example, the octets of the PSDU of the Data field may be placed in a transmit serial bit stream. The scrambler may use an initial register to scramble the data of the Data field.

According to some embodiments, a scrambler initialization for an MU-CTS transmission system may encode the output of the scrambler, for example using a binary convolution code (BCC) Encoder. The output of the encoder may be interleaved, for example using the BCC Interleaver. One or more BCC Interleaver blocks may be used. For example, a number of BCC Interleaver blocks may correspond to a number of spatial streams for the MU-MIMO transmission.

According to some embodiments, a scrambler initialization for an MU-CTS transmission system may include a Pre-forward error correction (FEC) PHY Padding block, which may precede the scrambler. Additionally a space time block coding (STBC) block may be applied only in certain scenarios, for example only for a single spatial stream transmission and only when a dual carrier modulation (DCM) is not applied.

According to some embodiments, a scrambler initialization for an MU-CTS transmission system may include a scrambler to scramble and/or unscramble data. The scrambler may be used to scramble data in and obtain scrambled data out. For example, the scrambler may be used to generate the Data field of a PPDU for a MU-MIMO transmission (e.g., a MU-RTS frame and/or a MU-CTS frame).

According to some embodiments, a scrambler initialization for an MU-CTS transmission system may include a scrambler that may use a register to scramble data and/or to unscramble data. The register may be represented by the string of binary values $[X^1\ X^2\ X^3\ X^4\ X^5\ X^6\ X^7]$. In other words, the register may be a variable value that may be used to transform unscrambled data into scrambled data (e.g., Data In to Scrambled Data Out) and/or to transform scrambled data into unscrambled data (e.g., Scrambled Data out to Data In). For example, a transmitting device may use a particular register (e.g., a particular 7-bit value) in sending a MU-RTS frame to a receiving device, where the MU-RTS frame includes scrambled data. In other words, the transmitting data may have used the particular register to scramble Data In and obtain Scrambled Data Out.

According to some embodiments, a scrambler initialization for an MU-CTS transmission system may use a particular register to unscramble the received Scrambled Data Out and obtain the Data In. The receiving device may use the particular register (or a value derived from the particular register) in sending a MU-CTS frame in response to the MU-RTS frame.

According to some embodiments, a scrambler initialization for an MU-CTS transmission system may determine that when a non-AP STA receives the MU-RTS, the non-AP STA may use the values in a Service field of the MU-RTS to initialize the scrambler for the MU-CTS response.

According to some embodiments, a scrambler initialization for an MU-CTS transmission system may determine a first option that the non-AP STA may use to initialize the scrambler for the MU-CTS response is to use the first 7 values of the Service field of the MU-RTS as the register for the scrambler. In other words, the first 7 values of the Service field of the MU-RTS may be represented by the string of binary values $[O^1\ O^2\ O^3\ O^4\ O^5\ O^6\ O^7]$. These 7 values may be used as the register of the scrambler (e.g., as $[X^1\ X^2\ X^3\ X^4\ X^5\ X^6\ X^7]$). These values may be used by the non-AP STA to generate the MU-CTS frame in response to the MU-RTS frame.

According to some embodiments, a scrambler initialization for an MU-CTS transmission system may determine that the non-AP HE STA transmitting a MU-CTS frame in response to an MU-RTS Trigger frame may set the initial state of the scrambler equal to the first 7 bits of the Service field received in the MU-RTS Trigger frame. Note that the order of the initial state of the scrambler may be the same order as that of the first 7 bits of the Service field (e.g., $X^1\ X^2\ X^3\ X^4\ X^5\ X^6\ X^7=O^1\ O^2\ O^3\ O^4\ O^5\ O^6\ O^7$ or the order of the initial state of the scrambler may be the reverse order as compared to the order of the first 7 bits of the Service field (e.g., $X^1\ X^2\ X^3\ X^4\ X^5\ X^6\ X^7=O^7\ O^6\ O^5\ O^4\ O^3\ O^2\ O^1$).

According to some embodiments, a scrambler initialization for an MU-CTS transmission system may determine a second option that the non-AP STA may use to initialize the scrambler for the MU-CTS response is to derive the 7 bits that the transmitting device used to initialize the register when the MU-RTS frame was transmitted. In other words, the non-AP STA may derive that the register used to initialize the MU-RTS frame was $[R^1\ R^2\ R^3\ R^4\ R^5\ R^6\ R^7]$. These 7 values may be used as the register of the scrambler 300 (e.g., such that the register used by the non-AP STA for the MU-RTS frame, $[X^1\ X^2\ X^3\ X^4\ X^5\ X^6\ X^7]$, is equal to $[R^1\ R^2\ R^3\ R^4\ R^5\ R^6\ R^7]$). These values may be used by the non-AP STA to generate the MU-CTS frame in response to the MU-RTS frame.

According to some embodiments, a scrambler initialization for an MU-CTS transmission system may determine that the non-AP HE STA transmitting the MU-CTS frame in response to an MU-RTS Trigger frame may set the initial state of the scrambler such that the first 7 bits of the service field in the MU-CTS are equal to the first 7 bits of the service field received in the MU-RTS Trigger frame. It is understood that the above descriptions are for purposes of illustration and are not meant to be limiting.

Numerous other examples, configurations, processes, algorithms, etc., may exist, some of which are described in greater detail below. Example embodiments will now be described with reference to the accompanying figures.

FIG. 1 is a network diagram illustrating an example network environment 100 of scrambler initialization for MU-CTS transmission, according to some example embodiments of the present disclosure.

Referring to FIG. 1, wireless network 100 may include one or more user device(s) 120 and one or more access point(s) (AP)(s) 102, which may communicate in accordance with IEEE 802.11 communication standards. The user device(s) 120 may be mobile devices that are non-stationary (e.g., not having fixed locations) or may be stationary devices.

Figure 5:
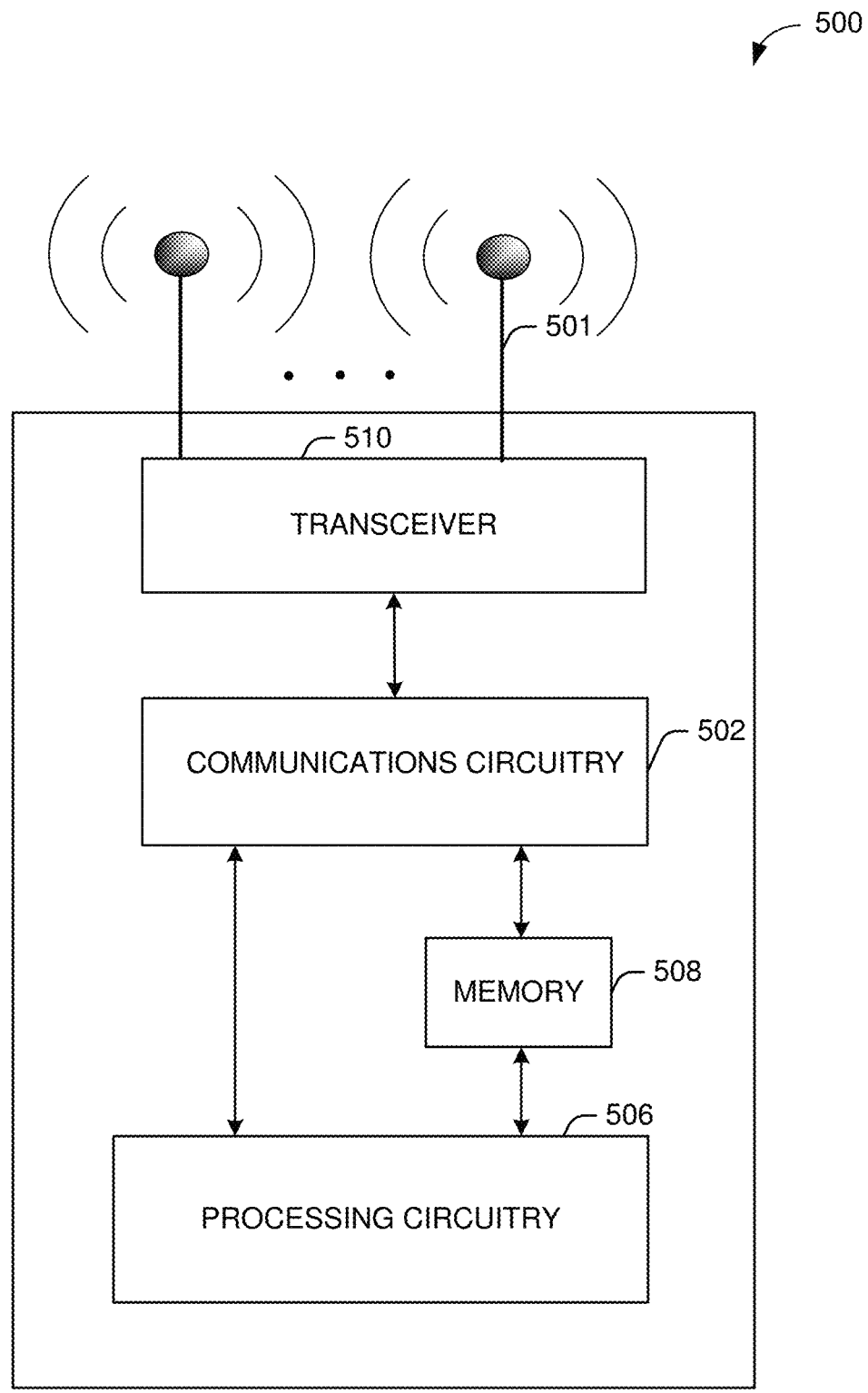
FIG. 5 illustrates a functional diagram of an exemplary communication station that may be suitable for use as a user device, in accordance with one or more example embodiments of the present disclosure.
Figure 6:
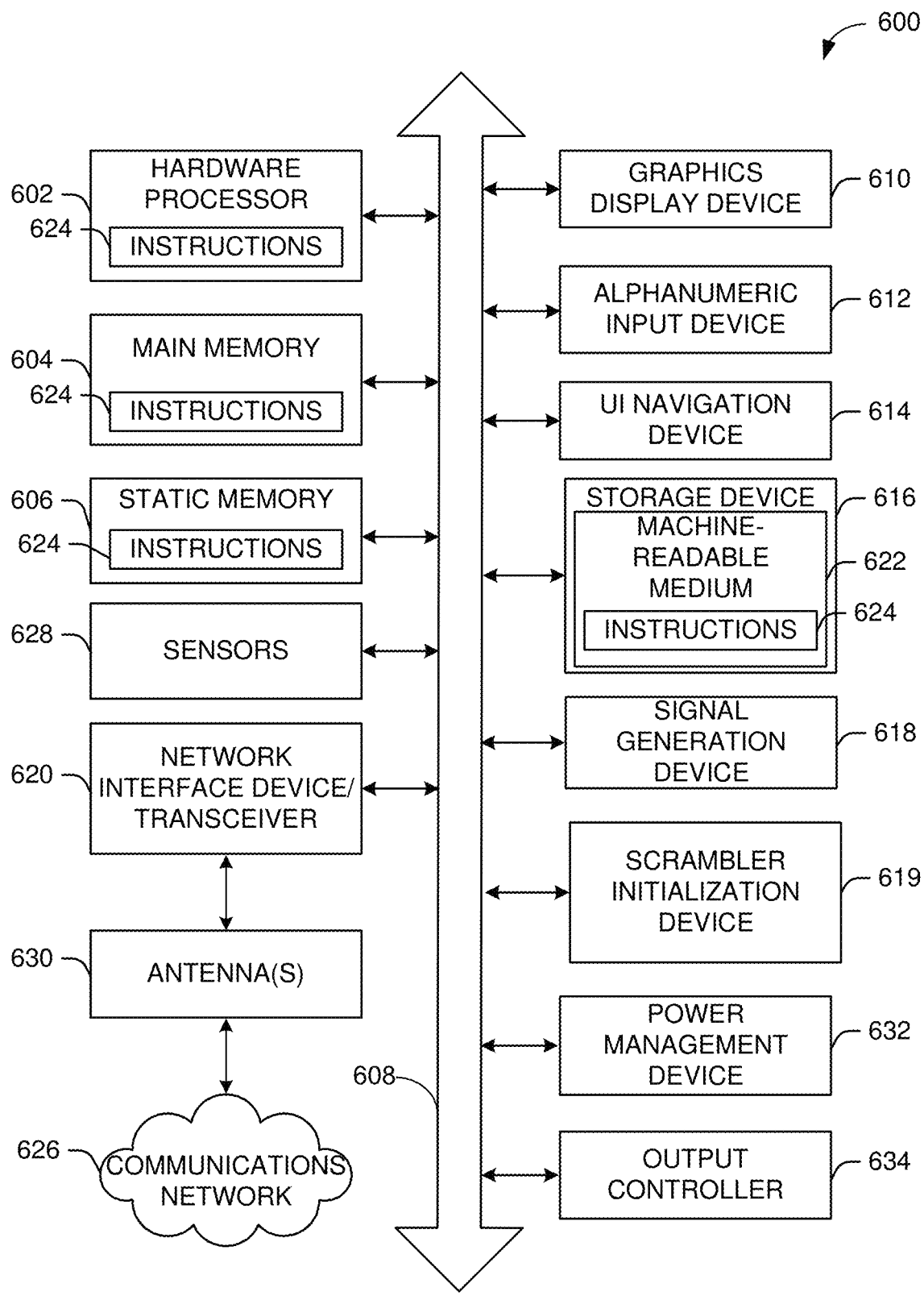
FIG. 6 illustrates a block diagram of an example machine upon which any of one or more techniques (e.g., methods) may be performed, in accordance with one or more example embodiments of the present disclosure.

In some embodiments, the user device(s) 120 and the AP(s) 102 may include one or more computer systems similar to that of the functional diagram of FIG. 5 and/or the example machine/system of FIG. 6.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra-mobile device (UMD), an ultra-mobile PC (UMPC), a mobile internet device (MID), an "origami" device or computing device, a device that supports dynamically compassable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), 60 GHz channels (e.g., 802.11ad, 802.11ay), or 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120. The AP(s) 102 and/or the user device(s) 120 may utilize scrambled data 142 when generating MU-RTS and MU-CTS frames.

It is understood that the above descriptions are for purposes of illustration and are not meant to be limiting.

Figure 2:
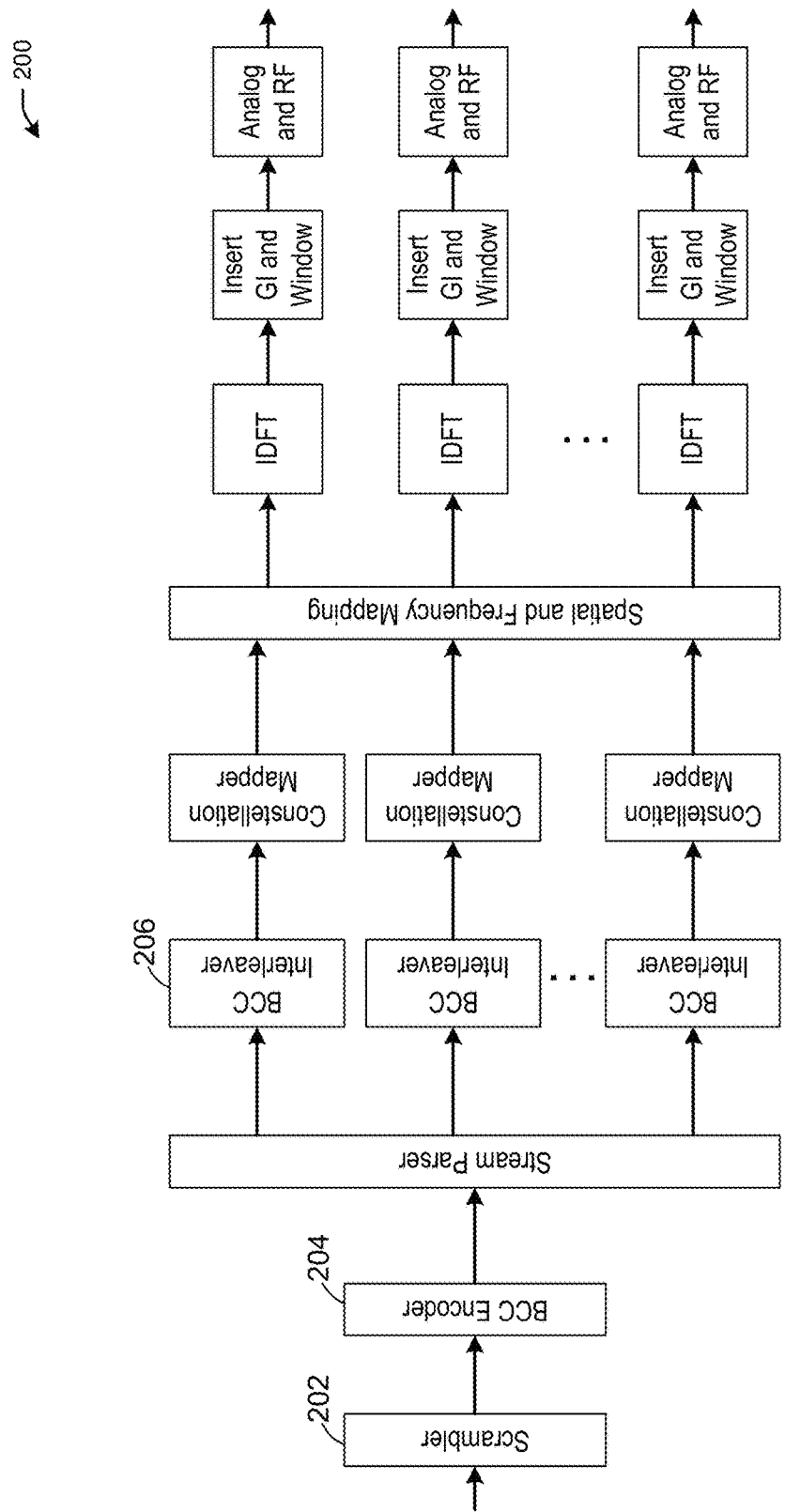
FIG. 2 depicts an illustrative transmitter block diagram for a physical layer convergence protocol (PLCP) protocol data unit (PPDU), in accordance with one or more example embodiments of the present disclosure.

FIG. 2 depicts an illustrative transmitter block diagram 200 for a physical layer convergence protocol (PLCP) protocol data unit (PPDU), in accordance with one or more example embodiments of the present disclosure.

Referring to FIG. 2, transmitter block diagram 200 shows the transmitter blocks that may be used to generate the Data field of a PPDU for a MU-MIMO transmission (e.g., a MU-RTS frame and/or a MU-CTS frame). During transmission, one or more PLCP service data units (PSDUs) may be processed (e.g., scrambled and coded) and appended to the physical layer (PHY) preamble to create a PPDU. Transmitter block diagram 200 illustrates an example embodiment in which scrambler 202 may operate according to the one or more embodiments of the present disclosure.

According to some embodiments, the Data field of a MU-MIMO transmission may be generated by passing the data through scrambler 202 to obtain scrambled data. The Data field may contain a Service field, a PSDU, one or more tail bits, and/or one or more pad bits. The data within the Data field (e.g., all of the bits of the Data field) may be scrambled, for example by scrambler 202.

According to some embodiments, the Service field may include a set number of bits (e.g., 16 bits). As discussed in greater detail below with respect to FIG. 3, one or more portions of the Service field may be used to scramble or descramble data. For example, the first 7 bits of the Service field may be used to scramble or descramble data. For example, the bits of the Service field may be used to initialize a register of the scrambler 202. The register of the scrambler 202 may be used to scramble outgoing data and/or to unscramble incoming data.

According to some embodiments, the scrambler 202 may be a length-127 PPDU-synchronous scrambler. For example, the octets of the PSDU of the Data field may be placed in a transmit serial bit stream. The scrambler 202 may use an initial register in order to scramble the data of the Data field.

According to some embodiments, the output of the scrambler 202 may be encoded, for example using the binary convolution code (BCC) Encoder 204. The output of the scrambler 202 may be interleaved, for example using the BCC Interleaver 206. As illustrated in FIG. 2, one or more BCC Interleaver blocks 206 may be used. For example, a number of BCC Interleaver blocks 206 may correspond to a number of spatial streams for the MU-MIMO transmission.

According to some embodiments, transmitter block diagram 200 may include additional blocks that are not illustrated in FIG. 2. For example, a Pre-forward error correction (FEC) PHY Padding block may precede the scrambler 202. Additionally a space time block coding (STBC) block may be applied only in certain scenarios, for example only for a single spatial stream transmission and only when a dual carrier modulation (DCM) is not applied.

It is understood that the above descriptions are for purposes of illustration and are not meant to be limiting.

Figure 3:
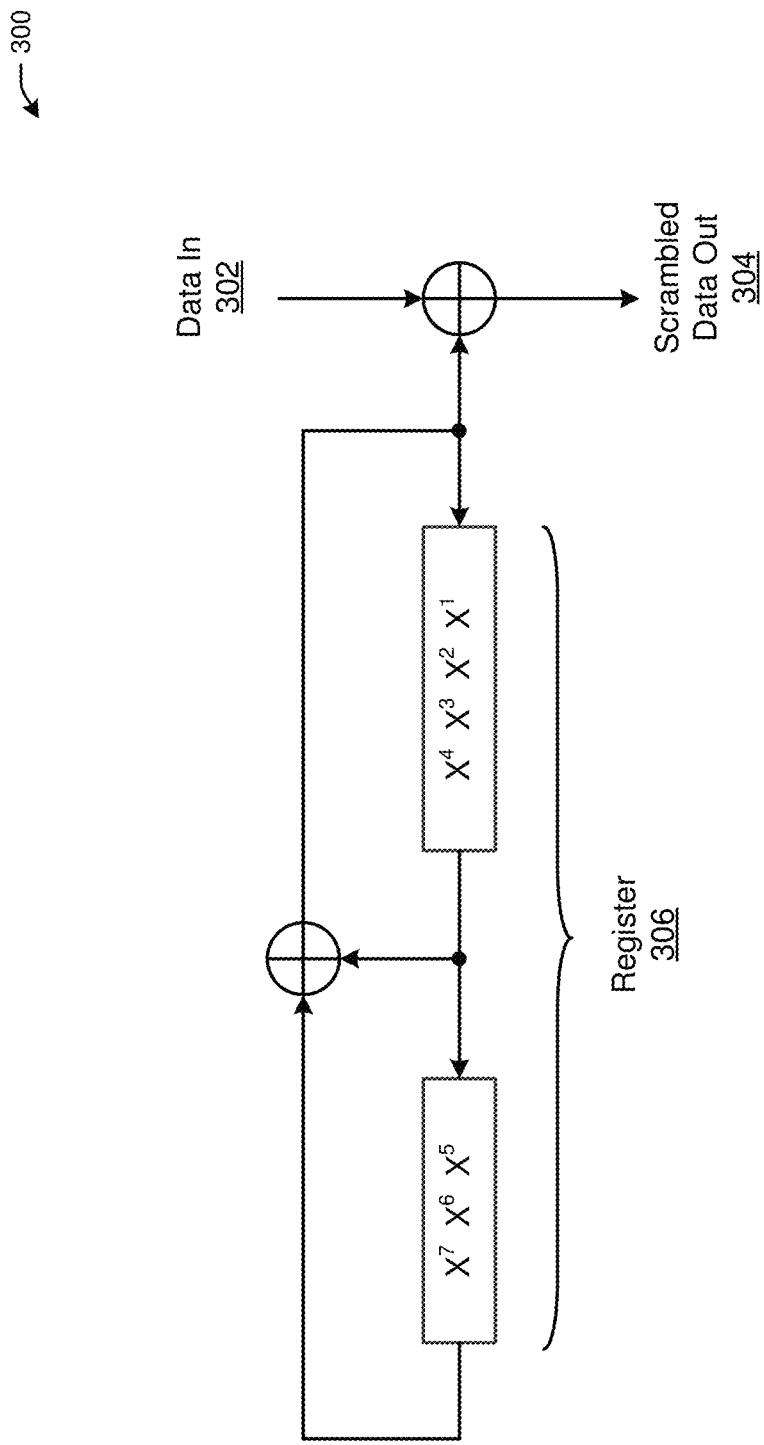
FIG. 3 depicts an illustrative schematic diagram for scrambler initialization for a MU CTS transmission, in accordance with one or more example embodiments of the present disclosure.

FIG. 3 depicts an illustrative schematic diagram for scrambler initialization for MU-CTS transmission, in accordance with one or more example embodiments of the present disclosure.

Referring to FIG. 3, scrambler 300 may be used to scramble and/or unscramble data. Note that scrambler 300 may correspond to scrambler 202 of FIG. 2. Scrambler 300 may be used to scramble Data In 302 and obtain Scrambled Data Out 304. For example, scrambler 300 may be used to generate the Data field of a PPDU for a MU-MIMO transmission (e.g., a MU-RTS frame and/or a MU-CTS frame).

According to some embodiments, scrambler 300 may use a register 306 to scramble data and/or to unscramble data. The register 306 may be represented by the string of binary values $[X^1\ X^2\ X^3\ X^4\ X^5\ X^6\ X^7]$. In other words, the register 306 may be a variable value that may be used to transform unscrambled data into scrambled data (e.g., Data In 302 to Scrambled Data Out 304) and/or to transform scrambled data into unscrambled data (e.g., Scrambled Data out 304 to Data In 302). For example, a transmitting device may use a particular register (e.g., a particular 7-bit value) in sending a MU-RTS frame to a receiving device, wherein the MU-RTS frame includes scrambled data. In other words, the transmitting data may have used the particular register to scramble Data In 302 and obtain Scrambled Data Out 304.

According to some embodiments, the receiving device may use the particular register to unscramble the received Scrambled Data Out 304 and obtain the Data In 302. The receiving device may use the particular register (or a value derived from the particular register) in sending a MU-CTS frame in response to the MU-RTS frame, as described in greater detail below.

According to some embodiments, when a non-AP STA receives the MU-RTS, the non-AP STA may use the values in a Service field of the MU-RTS to initialize the scrambler for the MU-CTS response.

According to some embodiments, a first option that the non-AP STA may use to initialize the scrambler for the MU-CTS response is to use the first 7 values of the Service field of the MU-RTS as the register for the scrambler. In other words, the first 7 values of the Service field of the MU-RTS may be represented by the string of binary values $[O^1\ O^2\ O^3\ O^4\ O^5\ O^6\ O^7]$. These 7 values may be used as the register of the scrambler 300 (e.g., as $[X^1\ X^2\ X^3\ X^4\ X^5\ X^6$ $X^7$]). These values may be used by the non-AP STA to generate the MU-CTS frame in response to the MU-RTS frame.

In other words, the non-AP HE STA transmitting a MU-CTS frame in response to an MU-RTS Trigger frame may set the initial state of the scrambler equal to the first 7 bits of the Service field received in the MU-RTS Trigger frame. Note that the order of the initial state of the scrambler may be the same order as that of the first 7 bits of the Service field (e.g., $X^1 X^2 X^3 X^4 X^5 X^6 X^7 = O^1 O^2 O^3 O^4 O^5 O^6 O^7$ or the order of the initial state of the scrambler may be the reverse order as compared to the order of the first 7 bits of the Service field (e.g., $X^1 X^2 X^3 X^4 X^5 X^6 X^7 = O^7 O^6 O^5 O^4 O^3 O^2 O^1$).

According to some embodiments, a second option that the non-AP STA may use to initialize the scrambler for the MU-CTS response is to derive the 7 bits that the transmitting device used to initialize the register when the MU-RTS frame was transmitted. In other words, the non-AP STA may derive that the register used to initialize the MU-RTS frame was [$R^1 R^2 R^3 R^4 R^5 R^6 R^7$]. These 7 values may be used as the register of the scrambler 300 (e.g., such that the register used by the non-AP STA for the MU-RTS frame, [$X^1 X^2 X^3 X^4 X^5 X^6 X^7$], is equal to [$R^1 R^2 R^3 R^4 R^5 R^6 R^7$]). These values may be used by the non-AP STA to generate the MU-CTS frame in response to the MU-RTS frame.

In other words, the non-AP HE STA transmitting the MU-CTS frame in response to an MU-RTS Trigger frame may set the initial state of the scrambler such that the first 7 bits of the service field in the MU-CTS are equal to the first 7 bits of the service field received in the MU-RTS Trigger frame.

It is understood that the above descriptions are for purposes of illustration and are not meant to be limiting.

Figure 4:
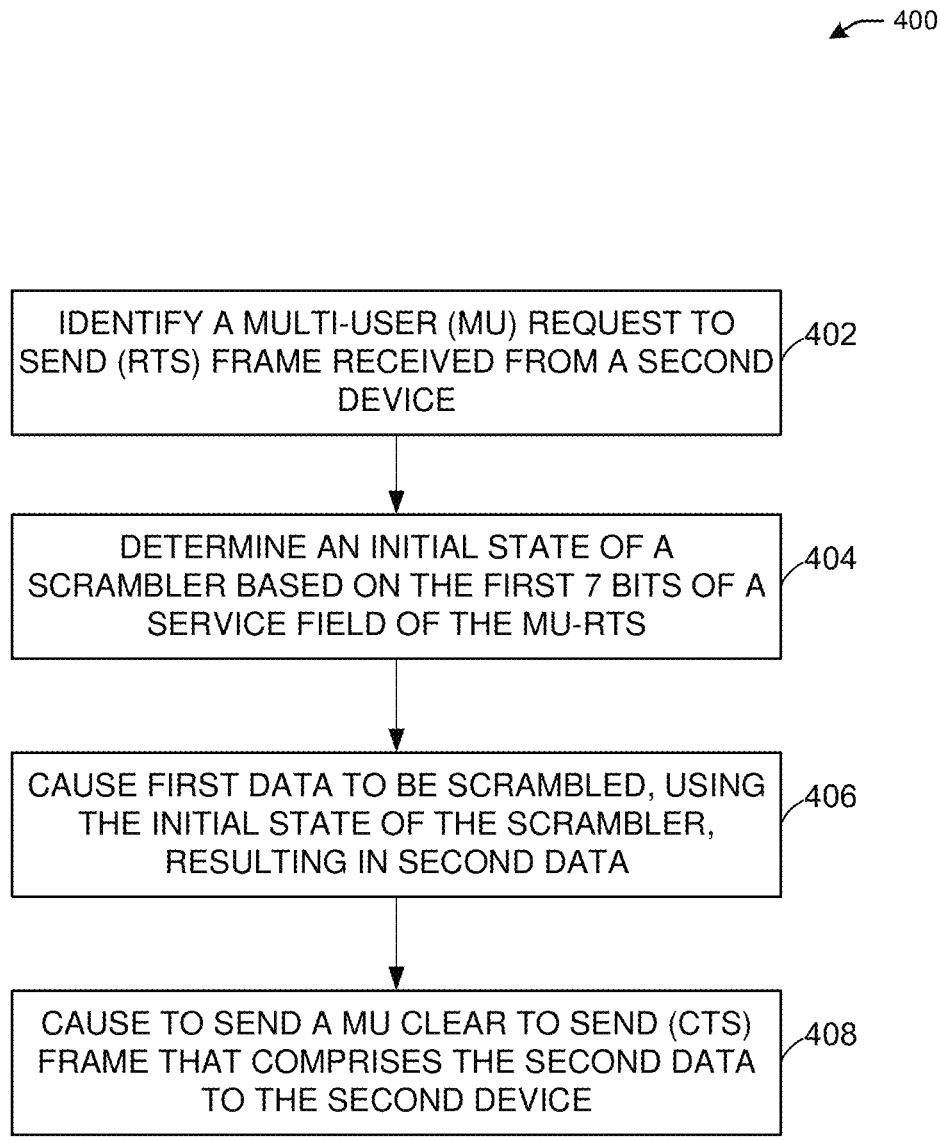
FIG. 4 illustrates a flow diagram of an illustrative process for an illustrative scrambler initialization for MU CTS transmission system, in accordance with one or more example embodiments of the present disclosure.

FIG. 4 illustrates a flow diagram of illustrative process 400 for an illustrative scrambler initialization for MU CTS transmission system, in accordance with one or more example embodiments of the present disclosure.

At block 402, a first device (e.g., the user device(s) 120 and/or the AP 102 of FIG. 1) may identify a multi-user (MU) request to send (RTS) frame received from a second device. The MU-RTS frame may comprise a first service field. The first device may comprise a transceiver configured to transmit and receive wireless signals. The first device may comprise an antenna coupled to the transceiver.

At block 404, the first device may determine, based on the MU-RTS frame, an initial state of a scrambler. The initial state of the scrambler may be determined based on the first 7 bits of a service field of the MU-RTS frame. The initial state of the scrambler may be determined such that the first 7 bits of the MU-RTS service field (e.g., the first service field) are equal to the first 7 bits of the MU-CTS service field (e.g., the second service). The initial state of the scrambler may be determined such that the initial state of the scrambler may be equal to the first 7 bits of the first service. The scrambler may be a length-127 physical layer convergence protocol (PLCP) protocol data unit (PPDU)-synchronous scrambler.

At block 406, the first device may cause first data to be scrambled, using the initial state of the scrambler, resulting in second data. The second data may be included in a service field of the MU-CTS frame.

At block 408, the first device may cause to send a MU clear to send (CTS) frame that comprises the second data to the second device. The MU-CTS field may comprise a second service field.

It is understood that the above descriptions are for purposes of illustration and are not meant to be limiting.

FIG. 5 shows a functional diagram of an exemplary communication station 500 in accordance with some embodiments. In one embodiment, FIG. 5 illustrates a functional block diagram of a communication station that may be suitable for use as an AP (e.g., AP 102 of FIG. 1) or a user device (e.g., user device 120 of FIG. 1) in accordance with some embodiments. The communication station 500 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or media access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in FIGS. 1-4.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device memory.

FIG. 6 illustrates a block diagram of an example of a machine 600 or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a scrambler initialization device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the scrambler initialization device 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600.

In an example, one or any combination of the hardware processor 602, the main memory 604, the static memory 606, or the storage device 616 may constitute machine-readable media.

The scrambler initialization device 619 may carry out or perform any of the operations and processes (e.g., process 400) described and shown above.

The scrambler initialization device 619 may generate a Data field of a PPDU for a MU-MIMO transmission (e.g., a MU-RTS frame and/or a MU-CTS frame). During transmission, one or more PLCP service data units (PSDUs) may be processed (e.g., scrambled and coded) and appended to the physical layer (PHY) preamble to create a PPDU.

The scrambler initialization device 619 may generate the Data field of a MU-MIMO transmission by passing the data through a scrambler to obtain scrambled data. The Data field may contain a Service field, a PSDU, one or more tail bits, and/or one or more pad bits. The data within the Data field (e.g., all of the bits of the Data field) may be scrambled, for example by the scrambler.

The scrambler initialization device 619 may determine the Service field, which may include a set number of bits (e.g., 16 bits). One or more portions of the Service field may be used to scramble or descramble data. For example, the first 7 bits of the Service field may be used to scramble or descramble data. For example, the bits of the Service field may be used to initialize a register of the scrambler. The register of the scrambler may be used to scramble outgoing data and/or to unscramble incoming data.

The scrambler initialization device 619 may include a scrambler that may be a length-127 PPDU-synchronous scrambler. For example, the octets of the PSDU of the Data field may be placed in a transmit serial bit stream. The scrambler may use an initial register in order to scramble the data of the Data field.

The scrambler initialization device 619 may encode the output of the scrambler, for example using a binary convolution code (BCC) Encoder. The output of the encoder may be interleaved, for example using a BCC Interleaver. One or more BCC Interleaver blocks may be used. For example, a number of BCC Interleaver blocks may correspond to a number of spatial streams for the MU-MIMO transmission.

The scrambler initialization device 619 may include a Pre-forward error correction (FEC) PHY Padding block, which may precede the scrambler. Additionally a space time block coding (STBC) block may be applied only in certain scenarios, for example only for a single spatial stream transmission and only when a dual carrier modulation (DCM) is not applied.

The scrambler initialization device 619 may include a scrambler to scramble and/or unscramble data. The scrambler may be used to scramble data in and obtain scrambled data out. For example, the scrambler may be used to generate the Data field of a PPDU for a MU-MIMO transmission (e.g., a MU-RTS frame and/or a MU-CTS frame).

The scrambler initialization device 619 may include a scrambler that may use a register to scramble data and/or to unscramble data. The register may be represented by the string of binary values $[X^1\ X^2\ X^3\ X^4\ X^5\ X^6\ X^7]$. In other words, the register may be a variable value that may be used to transform unscrambled data into scrambled data (e.g., Data In to Scrambled Data Out) and/or to transform scrambled data into unscrambled data (e.g., Scrambled Data out to Data In). For example, a transmitting device may use a particular register (e.g., a particular 7-bit value) in sending a MU-RTS frame to a receiving device, wherein the MU-RTS frame includes scrambled data. In other words, the transmitting data may have used the particular register to scramble Data In and obtain Scrambled Data Out.

The scrambler initialization device 619 may use a particular register to unscramble the received Scrambled Data Out and obtain the Data In. The receiving device may use the particular register (or a value derived from the particular register) in sending a MU-CTS frame in response to the MU-RTS frame.

The scrambler initialization device 619 may determine that when a non-AP STA receives the MU-RTS, the non-AP STA may use the values in a Service field of the MU-RTS to initialize the scrambler for the MU-CTS response.

The scrambler initialization device 619 may determine a first option that the non-AP STA may use to initialize the scrambler for the MU-CTS response is to use the first 7 values of the Service field of the MU-RTS as the register for the scrambler. In other words, the first 7 values of the Service field of the MU-RTS may be represented by the string of binary values $[O^1\ O^2\ O^3\ O^4\ O^5\ O^6\ O^7]$. These 7 values may be used as the register of the scrambler (e.g., as $[X^1\ X^2\ X^3\ X^4\ X^5\ X^6\ X']$). These values may be used by the non-AP STA to generate the MU-CTS frame in response to the MU-RTS frame.

The scrambler initialization device 619 may determine that the non-AP HE STA transmitting a MU-CTS frame in response to an MU-RTS Trigger frame may set the initial state of the scrambler equal to the first 7 bits of the Service field received in the MU-RTS Trigger frame. Note that the order of the initial state of the scrambler may be the same order as that of the first 7 bits of the Service field (e.g., $X^1\ X^2\ X^3\ X^4\ X^5\ X^6\ X^7 = O^1\ O^2\ O^3\ O^4\ O^5\ O^6\ O^7$ or the order of the initial state of the scrambler may be the reverse order as compared to the order of the first 7 bits of the Service field (e.g., $X^1\ X^2\ X^3\ X^4\ X^5\ X^6\ X^7 = O^7\ O^6\ O^5\ O^4\ O^3\ O^2\ O^1$).

The scrambler initialization device 619 may determine a second option that the non-AP STA may use to initialize the scrambler for the MU-CTS response is to derive the 7 bits that the transmitting device used to initialize the register when the MU-RTS frame was transmitted. In other words, the non-AP STA may derive that the register used to initialize the MU-RTS frame was $[R^1\ R^2\ R^3\ R^4\ R^5\ R^6\ R^7]$. These 7 values may be used as the register of the scrambler 300 (e.g., such that the register used by the non-AP STA for the MU-RTS frame, $[X^1\ X^2\ X^3\ X^4\ X^5\ X^6\ X^7]$, is equal to $[R^1\ R^2\ R^3\ R^4\ R^5\ R^6\ R^7]$). These values may be used by the non-AP STA to generate the MU-CTS frame in response to the MU-RTS frame.

The scrambler initialization device 619 may determine that the non-AP HE STA transmitting the MU-CTS frame in response to an MU-RTS Trigger frame may set the initial state of the scrambler such that the first 7 bits of the service field in the MU-CTS are equal to the first 7 bits of the service field received in the MU-RTS Trigger frame.

It is understood that the above are only a subset of what the scrambler initialization device 619 may be configured to perform and that other functions included throughout this disclosure may also be performed by the scrambler initialization device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium.

Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device," and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a first device, the first device comprising processing circuitry coupled to storage, the processing circuitry configured to: identify a multi-user (MU) request to send (RTS) frame received from a second device; determine an initial state of a scrambler based on the first 7 bits of a service field of the MU-RTS frame; cause first data to be scrambled, using the initial state of the scrambler, resulting in second data; and cause to send a MU clear to send (CTS) frame that comprises the second data to the second device.

Example 2 may include the first device of example 1 and/or some other example herein, wherein the service field is a first service field, and wherein the MU-CTS frame comprises a second service field.

Example 3 may include the first device of example 2 and/or some other example herein, wherein the initial state of the scrambler is determined such that the first 7 bits of the first service field are equal to the first 7 bits of the second service field.

Example 4 may include the first device of example 1 and/or some other example herein, wherein the initial state of the scrambler is determined such that the initial state of the scrambler is equal to the first 7 bits of the service field.

Example 5 may include the first device of example 1 and/or some other example herein, wherein the second data is included in a service field of the MU-CTS frame.

Example 6 may include the first device of example 1 and/or some other example herein, wherein the scrambler is a length-127 physical layer convergence protocol (PLCP) protocol data unit (PPDU)-synchronous scrambler.

Example 7 may include the first device of example 1 and/or some other example herein, further comprising a transceiver configured to transmit and receive wireless signals.

Example 8 may include the first device of example 7 and/or some other example herein, further comprising an antenna coupled to the transceiver.

Example 9 may include a non-transitory computer-readable medium storing computer-executable instructions which when executed by one or more processors of a first device result in performing operations comprising: identifying a multi-user (MU) request to send (RTS) frame received from a second device; determining an initial state of a scrambler based on the first 7 bits of a service field of the MU-RTS frame; causing first data to be scrambled, using the initial state of the scrambler, resulting in second data; and causing to send a MU clear to send (CTS) frame that comprises the second data to the second device.

Example 10 may include the non-transitory computer-readable medium of example 9 and/or some other example herein, wherein the service field is a first service field, and wherein the MU-CTS frame comprises a second service field.

Example 11 may include the non-transitory computer-readable medium of example 10 and/or some other example herein, wherein the initial state of the scrambler is determined such that the first 7 bits of the first service field are equal to the first 7 bits of the second service field.

Example 12 may include the non-transitory computer-readable medium of example 9 and/or some other example herein, wherein the initial state of the scrambler is determined such that the initial state of the scrambler is equal to the first 7 bits of the service field.

Example 13 may include the non-transitory computer-readable medium of example 9 and/or some other example herein, wherein the second data is included in a service field of the MU-CTS frame.

Example 14 may include the non-transitory computer-readable medium of example 9 and/or some other example herein, wherein the scrambler is a length-127 physical layer convergence protocol (PLCP) protocol data unit (PPDU)-synchronous scrambler.

Example 15 may include a method comprising: identifying, by one or more processors of a first device, a multi-user (MU) request to send (RTS) frame received from a second device; determining, by the one or more processors, an initial state of a scrambler based on the first 7 bits of a service field of the MU-RTS frame; causing, by the one or more processors, first data to be scrambled, using the initial state of the scrambler, resulting in second data; and causing to send, by the one or more processors, a MU clear to send (CTS) frame that comprises the second data to the second device.

Example 16 may include the method of example 15 and/or some other example herein, wherein the service field is a first service field, and wherein the MU-CTS frame comprises a second service field.

Example 17 may include the method of example 16 and/or some other example herein, wherein the initial state of the scrambler is determined such that the first 7 bits of the first service field are equal to the first 7 bits of the second service field.

Example 18 may include the method of example 15 and/or some other example herein, wherein the initial state of the scrambler is determined such that the initial state of the scrambler is equal to the first 7 bits of the service field.

Example 19 may include the method of example 15 and/or some other example herein, wherein the second data is included in a service field of the MU-CTS frame.

Example 20 may include the method of example 15 and/or some other example herein, wherein the scrambler is a length-127 physical layer convergence protocol (PLCP) protocol data unit (PPDU)-synchronous scrambler.

Example 21 may include an apparatus comprising means for: identifying a multi-user (MU) request to send (RTS) frame received from a second device; determining an initial state of a scrambler based on the first 7 bits of a service field of the MU-RTS frame; causing first data to be scrambled, using the initial state of the scrambler, resulting in second data; and causing to send a MU clear to send (CTS) frame that comprises the second data to the second device.

Example 22 may include the apparatus of example 21 and/or some other example herein, wherein the service field is a first service field, and wherein the MU-CTS frame comprises a second service field.

Example 23 may include the apparatus of example 22 and/or some other example herein, wherein the initial state of the scrambler is determined such that the first 7 bits of the first service field are equal to the first 7 bits of the second service field.

Example 24 may include the apparatus of example 21 and/or some other example herein, wherein the initial state of the scrambler is determined such that the initial state of the scrambler is equal to the first 7 bits of the service field.

Example 25 may include the apparatus of example 21 and/or some other example herein, wherein the second data is included in a service field of the MU-CTS frame.

Example 26 may include the apparatus of example 21 and/or some other example herein, wherein the scrambler is a length-127 physical layer convergence protocol (PLCP) protocol data unit (PPDU)-synchronous scrambler.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for receiving multi-user (MU) frames, the device comprising: processing circuitry coupled to storage, the processing circuitry configured to:
   identify a MU request to send (MU-RTS) frame received from a second device;
   identify first seven bits of a first initial scrambler value in the MU-RTS frame, wherein the first initial scrambler value is a first scrambled output;
   generate, using the first seven bits of the first initial scrambler value as a first seven bits of an initiation state of a scrambler, the first seven bits of a second initial scrambler value, wherein the second initial scrambler value is a second scrambled output, and the first seven bits of the second initial scrambler value are equal to the first initial scrambler value;
   generate a clear to send (CTS) frame comprising the first seven bits of the second initial scrambler value; and
   sending the CTS frame to the second device.

2. The device of claim 1, wherein the MU-RTS frame received from the second device is a MU-RTS trigger frame.

3. The device of claim 1, wherein the first initial scrambler value is associated with a scrambling sequence comprising 127 bits.

4. The device of claim 1, wherein the processing circuitry is further configured to generate a physical layer (PHY) protocol data unit (PPDU) comprising the CTS frame, and wherein to send the CTS frame comprises to send the PPDU comprising the CTS frame.

5. The device of claim 1, wherein the CTS frame comprises a service field of a data field.

6. The device of claim 5, wherein the service field consists of sixteen bits, and wherein the first seven bits of the sixteen bits are associated with a scrambling sequence.

7. The device of claim 1, further comprising a transceiver configured to transmit and receive wireless signals, wherein the wireless signals comprise the MU-RTS frame and the CTS frame.

8. The device of claim 7, further comprising an antenna coupled to the transceiver.

9. A non-transitory computer-readable medium storing computer-executable instructions which when executed by one or more processors of a first device result in performing operations comprising:
   identifying, at a first device, a multi-user (MU) request to send (MU-RTS) frame received from a second device;
   identifying first seven bits of a first initial scrambler value in the MU-RTS frame, wherein the first initial scrambler value is a first scrambled output;
   generating, using the first seven bits of the first initial scrambler value as a first seven bits of an initiation state of a scrambler, the first seven bits of a second initial scrambler value, wherein the second initial scrambler value is a second scrambled output, and the first seven bits of the second initial scrambler value are equal to the first initial scrambler value;
   generating a clear to send (CTS) frame comprising the first seven bits of the second initial scrambler value; and
   sending the CTS frame to the second device.

10. The non-transitory computer-readable medium of claim 9, wherein the MU-RTS frame received from the second device is a MU-RTS trigger frame.

11. The non-transitory computer-readable medium of claim 9, wherein the first initial scrambler value is associated with a scrambling sequence comprising 127 bits.

12. The non-transitory computer-readable medium of claim 9, the operations further comprising generating a physical layer (PHY) protocol data unit (PPDU) comprising the CTS frame, and wherein sending the CTS frame comprises sending the PPDU comprising the CTS frame.

13. The non-transitory computer-readable medium of claim 9, wherein the CTS frame comprises a service field of a data field.

14. The non-transitory computer-readable medium of claim 13, wherein the service field consists of sixteen bits, and wherein the first seven bits of the sixteen bits are associated with a scrambling sequence.

15. A method for sending and receiving multi-user (MU) frames, the method comprising:
   identifying, by processing circuitry of a first device, a multi-user (MU) request to send (MU-RTS) frame received from a second device;
   identifying, by the processing circuitry, first seven bits of a first initial scrambler value in the MU-RTS frame, wherein the first initial scrambler value is a first scrambled output;
   generating, by the processing circuitry, using the first seven bits of the first initial scrambler value as a first seven bits of an initiation state of a scrambler, the first seven bits of a second initial scrambler value, wherein the second initial scrambler value is a second scrambled output, and the first seven bits of the second initial scrambler value are equal to the first initial scrambler value;
   generating, by the processing circuitry, a clear to send (CTS) frame comprising the first seven bits of the second initial scrambler value; and sending, by the processing circuitry, the CTS frame to the second device.

16. The method of claim 15, wherein the MU-RTS frame received from the second device is a MU-RTS trigger frame.

17. The method of claim 15, wherein the first initial scrambler value is associated with a scrambling sequence comprising 127 bits.

18. The method of claim 15, further comprising generating a physical layer (PHY) protocol data unit (PPDU) comprising the CTS frame, and wherein sending the CTS frame comprises sending the PPDU comprising the CTS frame.

19. The method of claim 15, wherein the CTS frame comprises a service field of a data field.

20. The method of claim 19, wherein the service field consists of sixteen bits, and wherein the first seven bits of the sixteen bits are associated with a scrambling sequence.

* * * * *